US008656432B2

(12) United States Patent
Sullivan et al.

(10) Patent No.: US 8,656,432 B2
(45) Date of Patent: Feb. 18, 2014

(54) PROVIDING AUDIO SIGNALS USING A NETWORK BACK-CHANNEL (75) Inventors: Marc Sullivan, Austin, TX (US); Keith Crowe, Austin, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 38 days.

(21) Appl. No.: 12/464,652

(22) Filed: May 12, 2009

(65) Prior Publication Data
US 2010/0289954 A1 Nov. 18, 2010

(51) Int. Cl.
H04N 7/10 (2006.01)
G06F 3/00 (2006.01)
H04N 7/173 (2011.01)

(52) U.S. Cl.
USPC ............................................. 725/48; 725/118

(58) Field of Classification Search
None
See application file for complete search history.

(56) References Cited

U.S. PATENT DOCUMENTS

| 5,905,522 | A | * | 5/1999 | Lawler .......................... 725/131 |
| 6,078,950 | A | | 6/2000 | Heidemann et al. |
| 6,421,358 | B1 | * | 7/2002 | Stimmel et al. ............... 370/489 |
| 6,598,229 | B2 | | 7/2003 | Smyth et al. |
| 6,630,963 | B1 | * | 10/2003 | Billmaier ...................... 348/485 |
| 6,732,325 | B1 | | 5/2004 | Tash et al. |
| 7,069,208 | B2 | * | 6/2006 | Wang ............................ 704/211 |
| 7,103,669 | B2 | | 9/2006 | Apostolopoulos |
| 7,212,248 | B2 | | 5/2007 | Stanger |
| 7,296,204 | B2 | | 11/2007 | Merritt |
| 7,336,646 | B2 | * | 2/2008 | Muller ........................... 370/350 |
| 2003/0140345 | A1 | | 7/2003 | Fisk et al. |
| 2003/0208771 | A1 | * | 11/2003 | Hensgen et al. .............. 725/100 |
| 2006/0053436 | A1 | | 3/2006 | Allwein et al. |
| 2008/0320545 | A1 | * | 12/2008 | Schwartz ....................... 725/135 |
| 2011/0066706 | A1 | * | 3/2011 | Ostrover et al. .............. 709/219 |

\* cited by examiner

*Primary Examiner* — Brian Pendleton
*Assistant Examiner* — Jean D Saint Cyr
(74) *Attorney, Agent, or Firm* — Jackson Walker L.L.P.

(57) ABSTRACT

A method for providing audio portions of broadcast television signals is disclosed. A television signal is buffered by a multimedia client. In response to a user request, audio data may be obtained from a service provider and sent back to the multimedia client using a network back-channel. The obtained audio data may be synchronized with a video portion of the television signal and output to an audio device, while the television signal is output to a display device.

29 Claims, 10 Drawing Sheets

PROVIDING AUDIO SIGNALS USING A NETWORK BACK-CHANNEL

BACKGROUND

1. Field of the Disclosure

The present disclosure relates to the reception of television signals and, more particularly, to providing audio portions of television signals.

2. Description of the Related Art

Television signals typically include an audio component in addition to the video component. The audio portion is typically synchronously associated with the video component. An original audio component delivered with a television signal may be defective or undesirable.

DESCRIPTION OF EXEMPLARY EMBODIMENTS

In one aspect, a disclosed method for processing an over-the-air (OTA) transmitted television signal includes receiving the OTA transmitted television signal, including a video component and receiving, via a broadband network, audio data corresponding to the video component of the television signal. The method may further include synchronizing the video component and the audio data, outputting the video component to a display device, and outputting the audio data to an audio device. At least a portion of the broadband network may be a packet-switched network, for example, the Internet.

The method operations to synchronize may further include storing at least one of the video component and the audio data as content in a buffer, and, using the stored content in the buffer, outputting the video component in synchronous alignment with the audio data. The audio data may be received from a content provider different than an entity transmitting the OTA transmitted television signal. The OTA transmitted television signal may be terrestrially broadcast or broadcast from a satellite. The method may further include separating the video component from an audio component included in the OTA transmitted television signal. Responsive to receiving a user request, the method may include issuing a server request to return audio data suitable for replacing at least a portion of the audio component.

In another aspect, a disclosed service provides audio portions of a broadcast television signal to a multimedia client. Responsive to receiving a request from the multimedia client for a replacement audio portion corresponding to a broadcast television signal being received by the multimedia client, the service may include obtaining the replacement audio portion of the broadcast television signal, and returning to the multimedia client, via a broadband network, the obtained replacement audio portion. The broadband network may comprise an Internet-protocol network.

In some embodiments, the service may further include multicasting the obtained replacement audio portion to the plurality of multimedia clients, while a plurality of requests are received from a respective plurality of multimedia clients. The television signal may be broadcast wirelessly, while the plurality of multimedia clients may be located in a common geographic media market. The service may also include obtaining a network location for the multimedia client, while the television signal may be broadcast over a cable television network. The replacement audio portion may be obtained from a content provider different than an entity responsible for broadcasting the television signal. The replacement audio portion may be formatted for streaming over a packet-switched network. The replacement audio portion may include a spoken language different than the language spoken in the television signal.

In a further aspect, a disclosed device for remediating a digital television signal, includes a processor, a receiver to receive the digital television signal, and memory media coupled to the processor, including processor executable instructions. The instructions may be executable to identify an audio stream and a video stream in the digital television signal, and determine that at least a portion of the audio stream is degraded. Responsive to determining that at least a portion of the audio stream is degraded, the instructions may be executable to request a faultless portion of the audio stream corresponding to a degraded portion of the audio stream, receive the faultless portion, and remediate at least some of the degraded portion using the received faultless portion. The instructions may further be executable to output the digital television signal to a display device, including the remediated portion of the audio stream.

In some embodiments, the device further includes a network adapter configured for coupling to a packet-switched network. The instructions executable to request and receive may include instructions executable to communicate via the packet-switched network, while the faultless portion may be received via the packet-switched network. The device may further include instructions executable to convert the received faultless portion from a packed-based format to a digital television signal including the video stream. The received faultless portion may be an enhanced version of the degraded portion. The receiver may be configured to wirelessly receive the digital television signal. In some instances, the receiver may be configured to receive the digital television signal from a cable television network.

In yet another aspect, disclosed computer-readable memory media include processor executable instructions for combining a soundtrack with a received television signal. In response to receiving a user request for the soundtrack, the instructions may be executable to request, via a packet-switched network, the soundtrack corresponding to the television signal, and receive, via the packet-switched network, the soundtrack. The memory medium may further include instructions executable to subsequently output the television signal to a display device, while the soundtrack may be output to an audio device associated with the display device. The soundtrack may include a spoken language translation of an audio portion of the television signal into a different language. At least one of the television signal and the soundtrack may be stored in a first-in first-out (FIFO) buffer, while the instructions executable to combine may use the FIFO buffer to synchronize the soundtrack with a video portion of the television signal.

In some embodiments, the received television signal may be a digital television signal. The user request specifies a predetermined duration of the television signal for combining with the soundtrack. In response to receiving user input, the memory medium may further include instructions executable to output either the soundtrack or an original audio portion of the television signal to the audio device, while the television signal is output to the display device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, "multimedia content" may refer to a "television signal," which includes a video portion or video component. A television signal, as referred to herein, may further include an audio portion or audio component, also referred to as a "soundtrack." In some cases, a television signal may include a video portion but may lack an audible soundtrack. The audio portion may be synchronously associated with the video portion, such that the audio portion provides sounds, speech, music, etc., simultaneous with the corresponding images of the video portion. A television signal may be output to at least one device for viewing the video portion and at least one device for listening to the audio portion. Specifically, the video portion may be output to a display device and the audio portion may be output to an audio device (see FIG. 4). In some cases, the television signal is output to a television device, which may include a display device and an audio device.

Figure 1:
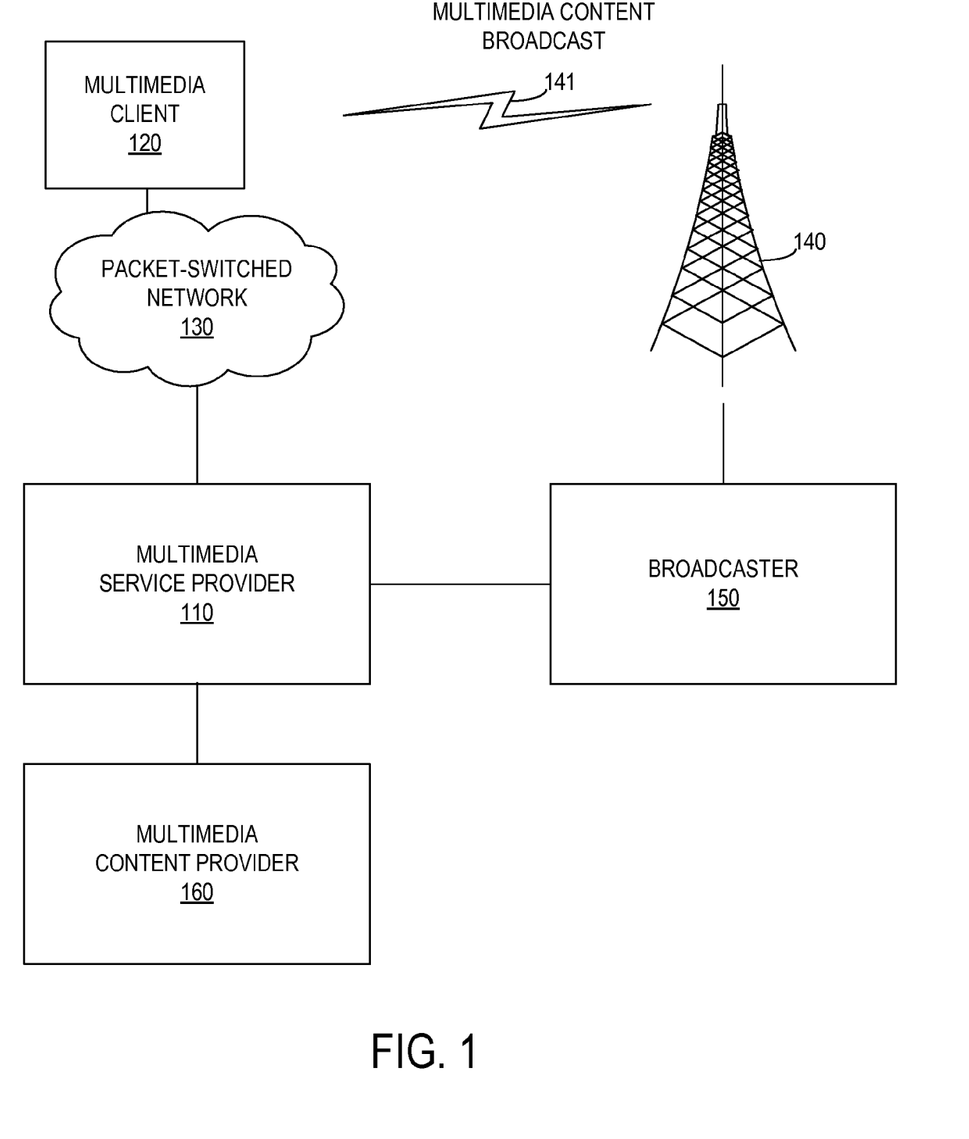
FIGS. 1-3 are block diagrams of selected elements of embodiments of multimedia content delivery systems.

Turning now to the drawings, FIG. 1 is a block diagram illustrating selected elements of an embodiment of a multimedia content delivery system. As depicted in FIG. 1, the system includes multimedia client 120, which is configured to receive multimedia content broadcast signal 141. Although one client 120 is depicted in FIG. 1, it will be understood that broadcast signal 141 may be transmitted to a plurality of receivers using broadcast tower 140. Broadcaster 150 uses broadcast tower 140 to disseminate the broadcast signal 141, including multimedia content, in a given geographical area. The geographic area may be a common geographic media market, such as a large city (not shown in FIG. 1).

Broadcaster 150 may itself be a producer of some portion of broadcast signal 141. Broadcaster 150 may also receive multimedia content from external sources (not shown in FIG. 1), and use this content to generate broadcast signal 141. In certain embodiments, broadcaster 150 is a television station and broadcast signal 141 is a digital television signal.

Multimedia client 120, as mentioned above, is configured to receive broadcast signal 141 for output of multimedia content (i.e., displaying, viewing, listening, etc.) to a user, also called a "viewer." In some embodiments, client 120 is configured to store broadcast signal 141, and output stored multimedia content at a later time. Accordingly, client 120 may be a television device with recording and display capability. In some cases, client 120 is an interactive multimedia device, including network capability (see FIG. 4).

As shown in FIG. 1, client 120 is configured for connectivity via packet-switched network 130. In some embodiments, network 130 is an Internet protocol (IP) compliant network. In certain cases, network 130 is the Internet. Network 130 may also be a private network. In some embodiments, network 130 is, at least in part, a coaxial cable network. In FIG. 1, network 130 provides connectivity between client 130 and multimedia service provider 110. IP-compliant embodiments of network 130 may include a physical layer of unshielded twisted pair cables, fiber optic cables, or a combination thereof. In some configurations, digital subscriber line (DSL) compliant twisted pair connections are provided between client 120 and a front-side node (not depicted) in network 130, while fiber, cable or another broadband medium connects back-end resources to the node. In other embodiments, a broadband line may extend all the way to clients 120. As will be discussed in detail below, the connection via network 130 may serve as a back-channel for requesting and providing multimedia content.

As depicted in FIG. 1, multimedia service provider 110 is configured to communicate via client 120 via packet-switched network 130. It is noted that in some embodiments, network 130 is owned and/or operated by service provider 110. In other embodiments, a third party may own and/or operate at least a portion of network 130. Service provider 110 may further be configured to communicate with broadcaster 150 for obtaining multimedia content on request. Content may be provided to multimedia service provider 110 via other backbone networks and/or switching networks (not shown in FIG. 1), such that different types of content may be acquired via different types of acquisition resources.

Multimedia service provider 110 may obtain some portion of multimedia content from multimedia content provider 160. For example, multimedia content provider 160 may maintain libraries of audio portions of television programs, such as those delivered by multimedia content broadcast signal 141. Multimedia service provider 110 may request an audio portion of a television program and provide the audio portion, in turn, to multimedia client 120. Multimedia service provider 110 may be configured to respond to requests from multimedia client 120 for partial or full delivery of audio portions of television programs.

In FIG. 1, as client 120 receives multimedia content broadcast signal 141, a determination may be made that some portions of broadcast signal 141 are corrupted, degenerated, deteriorated, distorted, in error, or otherwise undesirable. For example, the client may request service provider 110 to send certain audio portions corresponding to broadcast signal 141 via network 130. The service provider 110 may then obtain audio portions corresponding to broadcast signal 141 from an external entity, such as multimedia content provider 160. The service provider 110 may then transmit the requested audio portions corresponding to broadcast signal 141 to client 120 via network 130. In some cases, service provider 110 may multicast audio portions corresponding to broadcast signal 141 to a plurality of clients via network 130.

In one embodiment, client 120 may make a determination that an audio portion corresponding to broadcast signal 141 should be obtained from a different source than broadcaster 150, or that a different audio portion than that provided by broadcaster 150 should be output. The selection of the audio portion may be made by a user of client 120, who may provide user input therefor. A desired audio portion may be a soundtrack in a different language, or a higher quality audio component.

Client 120 may receive the requested audio portions corresponding to broadcast signal 141 and use these in combination with broadcast signal 141. In some embodiments, client 120 and service provider 110 are configured to reconstruct broadcast signal 141 in an original quality, such that broadcast errors or signal distortions introduced during broadcast are remediated. In certain cases, client 120 obtains a soundtrack from service provider 110 and outputs the soundtrack synchronously with a television signal, such as broadcast signal 141. In some instances, the soundtrack obtained using network 130 from service provider 110 may be a higher quality than an original soundtrack provided by broadcast signal 141. The obtained audio portion may also be a soundtrack in a different language.

Figure 2:
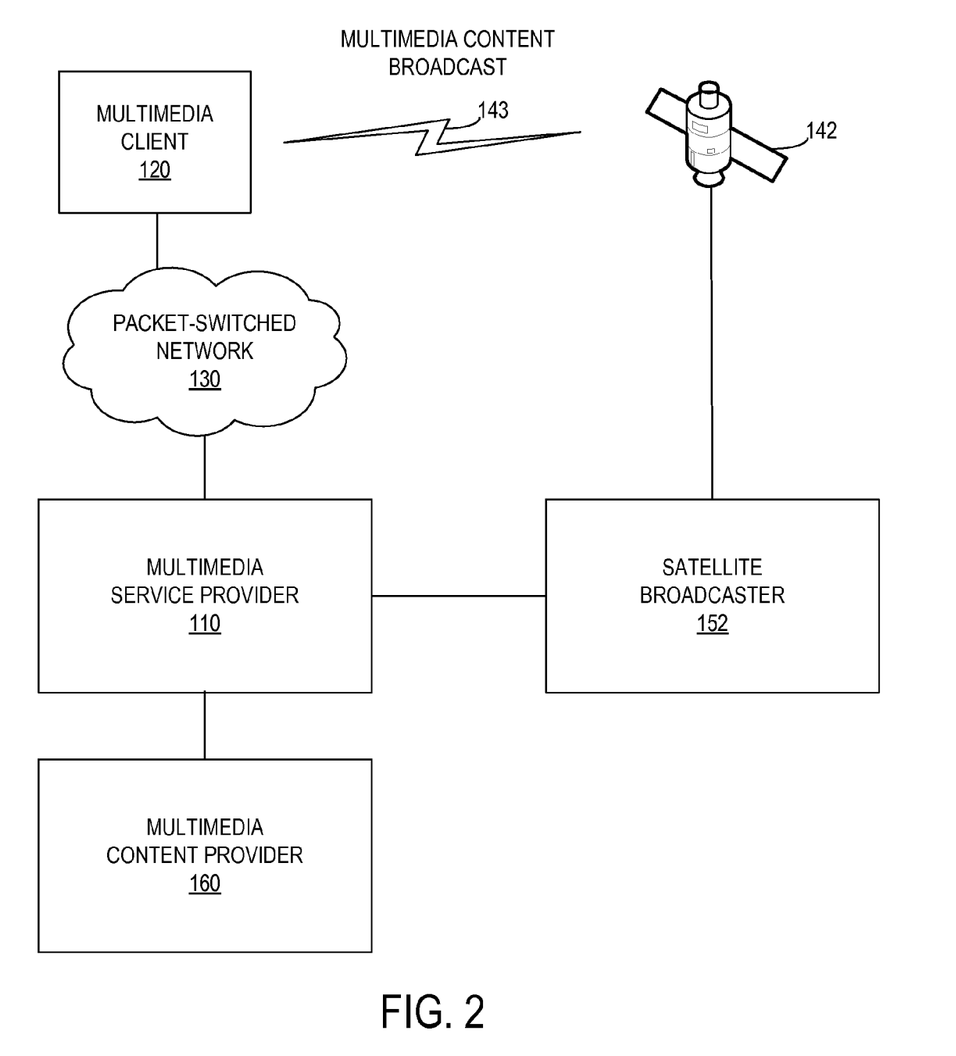

Turning now to FIG. 2, a block diagram illustrating selected elements of an embodiment of a multimedia content delivery system is shown. Like-numbered elements in FIG. 2 are discussed above with respect to FIG. 1. As depicted in FIG. 2, multimedia client 120 is configured to receive multimedia content satellite signal 143 transmitted to a plurality of receivers using satellite 142. Satellite broadcaster 152 uses satellite 142 to disseminate the satellite signal 143, including multimedia content, in a given geographical area. The geographic area may be a common geographic media market, such as a region or a nation (not shown in FIG. 1).

Satellite broadcaster 152 may itself be a producer of some portion of broadcast signal 143. Satellite broadcaster 152 may also receive multimedia content from an external content provider (not shown in FIG. 2), and use this content to uplink data to satellite 142, which generates satellite signal 143. In certain embodiments, satellite broadcaster 152 is a television network and satellite signal 143 is a digital television signal.

Multimedia client 120, as mentioned above, is configured to receive broadcast signal 143 for output of multimedia content (i.e., displaying, viewing, listening, etc.). In some embodiments, client 120 is configured to store satellite signal 143, and output stored multimedia content at a later time.

As shown in FIG. 2, multimedia service provider 110 may be configured to communicate with multimedia content provider 160 for obtaining multimedia content on request, and providing the multimedia content to client 120, as described above with respect to FIG. 1.

In FIG. 2, as client 120 receives multimedia content satellite signal 143, a determination may be made that some portions of satellite signal 143 are corrupted, degenerated, deteriorated, distorted, in error, or otherwise undesirable. For example, the client may request service provider 110 to send certain audio portions corresponding to the satellite signal 143 via network 130. The service provider 110 may then obtain audio portions corresponding to satellite signal 143 from an external entity, such as multimedia content provider 160. The service provider 110 may then transmit the requested audio portions corresponding to satellite signal 143 to client 120 via network 130. In some cases, service provider 110 may multicast audio portions corresponding to satellite signal 143 to a plurality of clients via network 130.

In one embodiment, client 120 may make a determination that an audio portion corresponding to satellite signal 143 should be obtained from a different source than broadcaster 150, or that a different audio portion than that provided by satellite broadcaster 152 should be output. Client 120 may receive the requested audio portions corresponding to satellite signal 143 and use these in combination with satellite signal 143. In some embodiments, client 120 and service provider 110 are configured to reconstruct satellite signal 143 in the original quality, such that broadcast errors or signal distortions introduced during broadcast are remediated. In certain cases, client 120 obtains a soundtrack from service provider 110 and outputs the soundtrack synchronously with a television signal, such as satellite signal 143. In some instances, the soundtrack obtained using network 130 from service provider 110 may be a higher quality than an original soundtrack provided by satellite signal 143. The obtained audio portion may also be a soundtrack in a different language.

Figure 3:
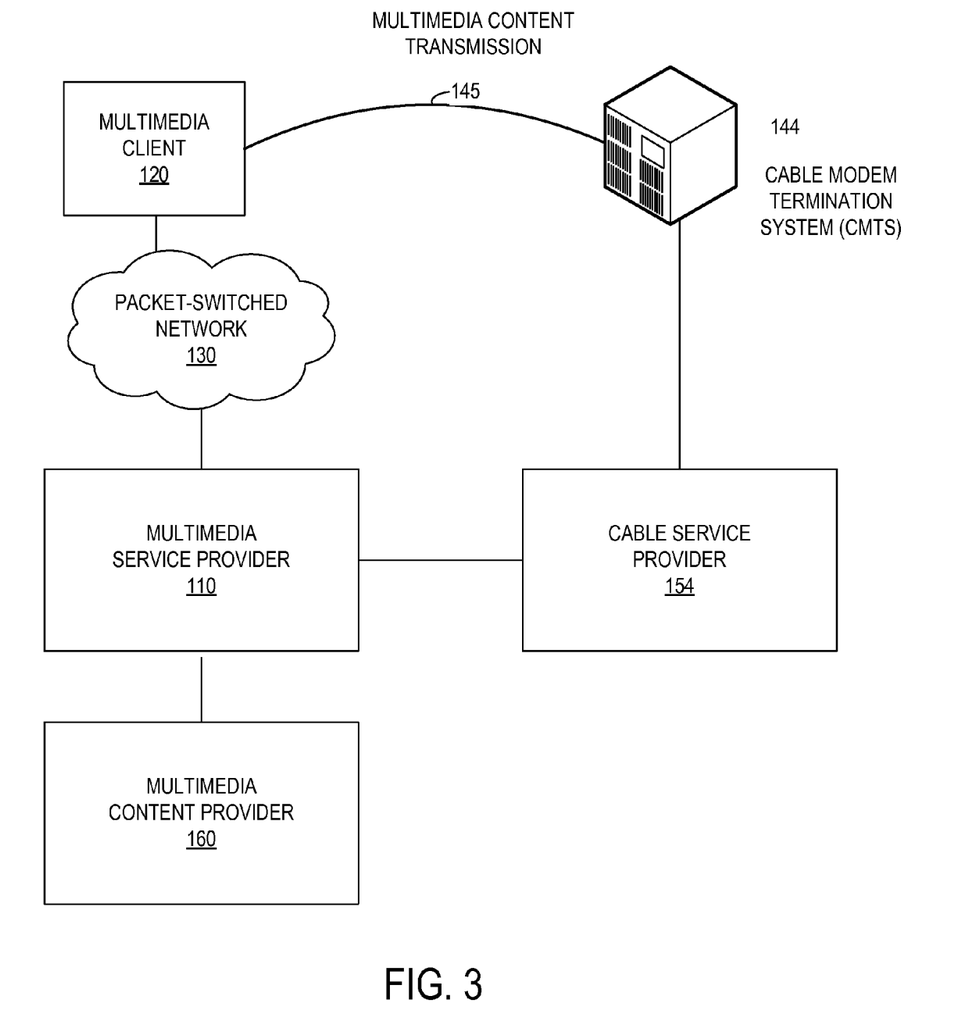

Turning now to FIG. 3, a block diagram illustrating selected elements of an embodiment of a multimedia content delivery system is shown. Like-numbered elements in FIG. 3 are discussed above with respect to FIG. 1. As depicted in FIG. 3, multimedia client 120 is configured to receive multimedia content cable signal 145 transmitted to a plurality of receivers using cable modem termination system (CMTS) 144. Cable service provider 154 may use CMTS 144 to disseminate the cable signal 145 in a given geographical area. The geographic area may be a common geographic media market (not shown in FIG. 1).

Cable service provider 154 may itself be a producer of some portion of cable signal 145. Cable service provider 154 may also receive multimedia content from an external content provider (not shown in FIG. 3), and use this content to generate cable signal 145. In certain embodiments, cable signal 145 is a digital television signal.

Multimedia client 120, as mentioned above, is configured to receive cable signal 145 for output of multimedia content (i.e., display, viewing, listening, etc.). In some embodiments, client 120 is configured to store cable signal 145, and output stored multimedia content at a later time.

As shown in FIG. 3, multimedia service provider 110 may further be configured to communicate with multimedia content provider 160 for obtaining multimedia content on request, and providing the multimedia content to client 120, as described above with respect to FIG. 1.

In FIG. 3, as client 120 receives multimedia cable signal 145, a determination may be made that some portions of cable signal 145 are corrupted, degenerated, deteriorated, distorted, in error or otherwise undesirable. For example, the client may request multimedia service provider 110 to send certain audio portions corresponding to the cable signal 145 via network 130. Multimedia service provider 110 may then obtain audio portions corresponding to cable signal 145 from an external entity, such as multimedia content provider 160. Multimedia service provider 110 may then transmit the requested audio portions corresponding to cable signal 145 to client 120 via network 130. In some cases, multimedia service provider 110 may multicast audio portions corresponding to cable signal 145 to a plurality of clients via network 130.

In one embodiment, client 120 may make a determination that an audio portion corresponding to cable signal 145 should be obtained from a different source than broadcaster 150, or that a different audio portion than that provided by cable service provider 154 should be output. Client 120 may receive the requested audio portions corresponding to cable signal 145 and use these in combination with cable signal 145. In some embodiments, client 120 and service provider 110 are configured to reconstruct cable signal 145 in the original quality, such that transmission errors or signal distortions introduced during cable transmission are remediated. In certain cases, client 120 obtains a soundtrack from multimedia service provider 110 and outputs the soundtrack synchronously with a television signal, such as cable signal 145. In some instances, the soundtrack obtained using network 130 from multimedia service provider 110 may be a higher quality than an original soundtrack provided by cable signal 145. The obtained audio portion may also be a soundtrack in a different language.

Figure 4:
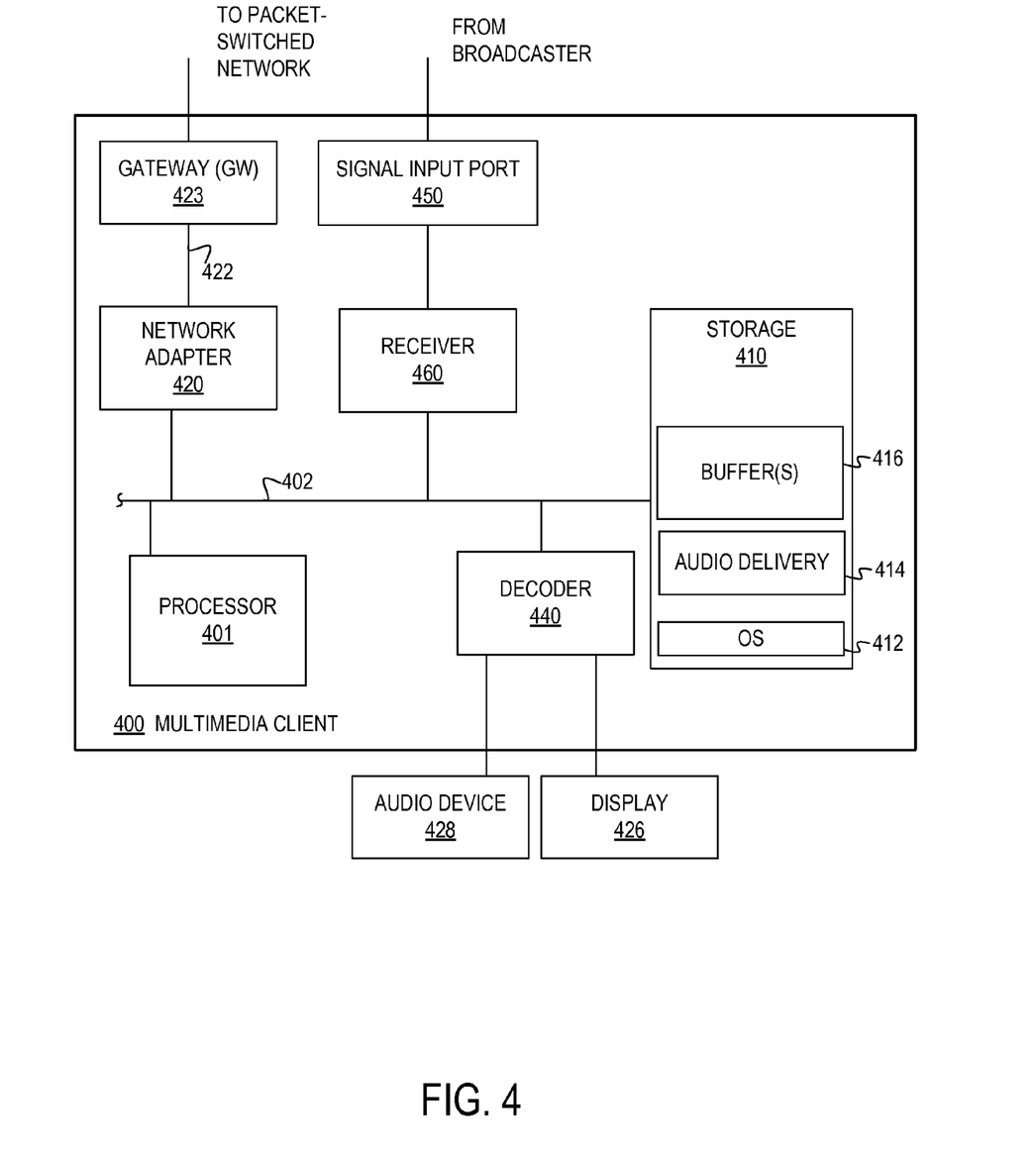
FIG. 4 is a block diagram of selected elements of an embodiment of a multimedia client device.

Turning now to FIG. 4, selected elements of one embodiment of multimedia client 400 is shown. In some instances, client 400 is exemplary of multimedia client 120 shown in FIG. 1. In the depicted embodiment, client 400 is configured to include processor 401, decoder 440, storage 410, receiver 460, network adapter 420, gateway (GW) 423, signal input port 450, audio device 428, and display device 426. It is noted that any combination of elements depicted in client 400 may be integrated into a single physical device, or interconnected as multiple physical devices.

In FIG. 4, GW 423 provides connectivity for client 400 to a network, such as network 130 (not explicitly shown in FIG. 4). GW 423 may provide an interface and conversion function between an external network and client-side local area network (LAN) 422. In some embodiments, the client-side LAN 422 may encompass or represent an IEEE 802.3 (Ethernet) LAN, an IEEE 802.11-type (WiFi) LAN, or a combination thereof. GW 423 may include elements of a conventional DSL or cable modem. GW 423, in some embodiments, may further include routing functionality for routing multimedia content, conventional data content, or a combination of both in compliance with IP or another network layer protocol. GW 423 may still further include WiFi or another type of wireless access point to extend the client-side LAN 422 to wireless-capable devices in proximity to GW 423. GW 423 may also provide a firewall (not depicted) between connected networks or network segments.

Client 400, as depicted in FIG. 4, may further include, or be coupled to, a display device or, more simply, a display 426. Display 426 may be implemented as a TV, a liquid crystal display screen, a computer monitor, or the like. Display 426 may comply with a display standard such as NTSC (National Television System Committee), PAL (Phase Alternating Line), or another suitable standard. Display 426 may itself include one or more integrated speakers to play audio content, such as those represented by audio device 428. It is noted that in some embodiments, client 400 is itself implemented as a television apparatus having connectivity and functionality, as described herein. Accordingly, client 400 is enabled and configured to process incoming multimedia signals to produce audio and visual signals suitable for delivery to display 426 and any optional external speakers (not depicted). It is further noted that in some embodiments, display 426 and audio device 428 are external devices which receive output signals from multimedia client 400, such as television signals and audio portions of television signals.

In the embodiment depicted in FIG. 4, client 400 includes processor 401 coupled via shared bus 402 to storage media collectively identified as storage 410. Client 400, as depicted in FIG. 4, further includes network adapter 420 that may interface client 400 to a client-side LAN 422 and GW 423, as discussed above. Client 400 is further shown in FIG. 4 including receiver 460 which may receive, amplify, filter, rectify and/or demodulate an incoming multimedia signal from signal input port 450. In embodiments involving receipt of a broadcast signal, such as signal 141 in FIG. 1 or signal 143 in FIG. 2, signal input port 450 may be a suitable antenna or antenna system, and may include a pre-amplifier. In other embodiments involving receipt of a cable signal, such as signal 145 in FIG. 3, signal input port 450, alone or in combination with receiver 460, may be a cable modem.

As depicted in FIG. 4, client 400 may include decoder 440 that may receive video and/or audio streams and generate native format video and/or audio streams. Decoder 440 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 440 may employ any of various audio decoding algorithms including Dolby® Digital, Digital Theatre System (DTS) Coherent Acoustics, and Windows Media Audio (WMA). The native format video and/or audio streams may be processed by decoder 440 to produce analog video and/or audio signals in a format compliant with display 426, which itself may not be a part of client 400. Display 426 may comply with NTSC, PAL or any other suitable television standard.

In FIG. 4, storage 410 encompasses persistent and volatile media, fixed and removable media, and magnetic and semiconductor media. Storage 410 is operable to store instructions, data, or both. Storage 410 as shown includes sets or sequences of instructions, namely, an operating system 412 and an audio delivery program identified as audio delivery 414. Operating system 412 may be a UNIX or UNIX-like operating system, a Windows® family operating system, or another suitable operating system.

Storage 410 may further include at least one buffer(s) 416 for storing incoming multimedia content signals, which may be provided by receiver 460 via bus 402. In some embodiments, buffer(s) 416 represents at least one FIFO buffer, while audio delivery 414 accesses and processes multimedia signals stored in buffer(s) 416. In certain instances, buffer(s) 416 may also include separate buffers, or queues, for multimedia content, television signals, video portions, and audio portions of television signals. In some cases, audio delivery 414 may cause a buffering delay to be introduced before audio and video portions of television signals are output from buffer(s) 416.

Accordingly, audio delivery 414 may perform a synchronization of television signals and audio portions that are output from buffer(s) 416. It is noted that audio delivery 414 may be configured for various synchronization schemes, according to the configuration of buffer(s) 416. In one example of synchronization, buffer(s) 416 may store a television signal, including a video portion, while multimedia client 400 receives an audio portion. In this case, audio delivery 414 may retrieve a video portion from buffer(s) 416 corresponding to a received audio portion. The video and audio portions may then be output to at least one output device, such as display 426 and audio device 428.

In different embodiments, buffer(s) 416 may store the audio portions along with, or instead of, the video portions. In one implementation, buffer(s) 416 may store a television signal, including an original video and audio portion, and may further store a secondary audio portion. The secondary audio portion may be received from a broadband network, for example using GW 423. Audio delivery 414 may be configured to respond to user input for selecting either the original audio portion or the secondary audio portion for output while the original video portion is output.

Figure 5:
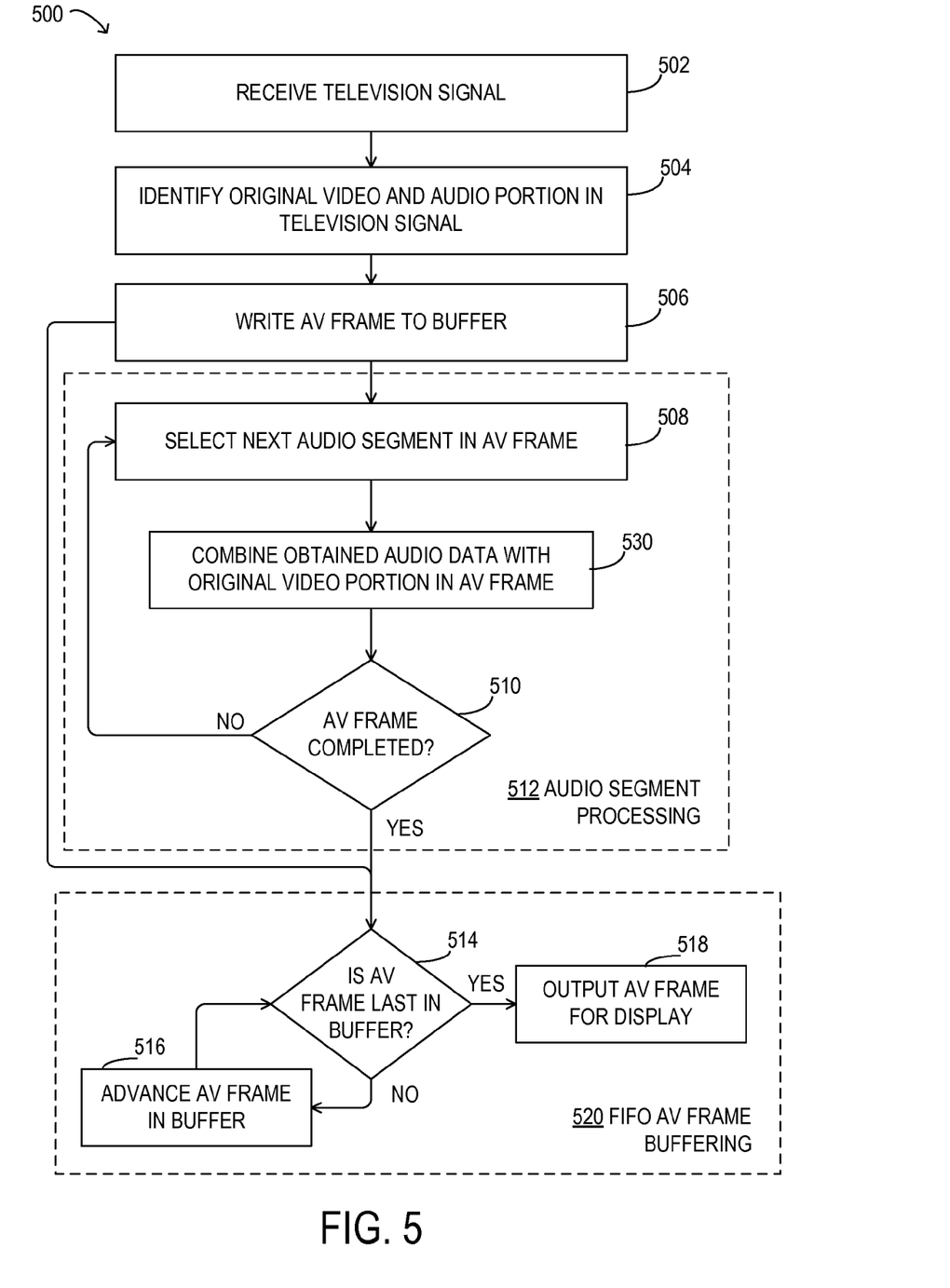
FIGS. 5-7 and 8A-C illustrate selected embodiments of methods for providing an audio portion of a television signal.

Referring now to FIG. 5, one embodiment of a method 500 for remediating a multimedia content signal is shown. It is noted that the operations depicted in FIG. 5 may be rearranged, duplicated, or omitted in various embodiments of method 500. Client 400, as shown in FIG. 4, is configured to execute method 500.

For descriptive clarity in FIG. 5, the multimedia content signal is assumed to be a digital television signal, as described above, in the following discussion. A "frame" of the television signal is referred to herein as a time-correlated portion of the digital television signal, for example, an individual image for a given video channel. In some embodiments, a frame represents time-correlated portions of data for a plurality of channels, irrespective of whether the channels are selected (i.e., for viewing or recording). A "segment" as used herein refers to an atomic portion of a frame, for which processing according to the methods described herein may be requested. Thus, an "audio segment" refers to an atomic portion of the audio portion of the television signal. In different embodiments, the size of a selected segment may vary relative to the size of a frame. In some embodiments, a video segment represents a given number of image pixels in an image frame of a video portion of the television signal. An audio segment may represent a certain duration of the audio soundtrack.

In method 500, the incoming television signal is received (operation 502). In different embodiments of method 500, the incoming television signal may be broadcast signal 141, satellite signal 143, or cable signal 145 (see FIGS. 1-3), and may include a video portion or an audio portion, or both. In the specific example described below, the television signal may include an original audio and video portion. In some embodiments, signal input 450 (FIG. 4) is configured to receive the television signal, as in operation 502. After receipt of the television signal in operation 502, the original video and audio portion of the television signal are identified (operation 504). In some implementations, decoder 440 is configured for identification, as in operation 504. In some cases, the incoming television signal may not include an audio portion. Thus, in some embodiments, only the video portion of the television signal may be identified in operation 504.

An audio-visual (AV) frame may then be written to a buffer (operation 506). The AV frame may include a segment of either audio or video portions of the television signal, or both. The amount of data in the AV frame may represent a certain duration of the television signal. After operation 506, method 500, as shown in FIG. 5, follows two parallel and simultaneous paths as the AV frame is written to the buffer.

One path, shown as a sub-process in FIG. 5, is referred to as audio segment processing 512. Audio segment processing 512 includes operations performed on buffered AV frames, and is described relative to one buffered AV frame. It is noted that audio segment processing 512 may be repeated for subsequently buffered AV frames (not shown in FIG. 5). An audio segment associated with an AV frame may represent a duration of audio data between subsequent AV frames (i.e., whose length may depend on the AV frame update rate). An audio segment in the buffered AV frame is selected (operation 508). Obtained audio data may then be combined with an original video portion of the AV frame (operation 530, see also FIG. 6). The obtained audio data may correspond to the selected audio segment, and may be obtained using a broadband network. After combination in operation 530, a decision is made whether or not the AV frame has been completed (operation 510). If the result of operation 510 is NO, then method 500 returns to operation 508, from where additional audio segments are selected and processed. If the result of operation 510 is YES, then audio segment processing 512 is complete.

The other path which begins parallel to segment processing 512 is also a sub-process in FIG. 5, denoted as FIFO AV frame buffering 520. FIFO AV frame buffering 520 involves the advancement of AV frames in the frame buffer and may be executed by buffer(s) 416 (see FIG. 4). For a given frame, a decision is made whether the AV frame is the last AV frame in the buffer (operation 514). If the result of operation 514 is YES, then the AV frame is output for display and audio (i.e., sound) generation (operation 518). If the result of operation 514 is NO, then the AV frame is advanced in the buffer (operation 516). In some embodiments of operation 516, AV frame advancement occurs synchronous to receiving a new AV frame in the buffer.

Since sub-processes 512 and 520 run parallel to one another, certain system constraints, such as buffer size, network capacity, processing capacity, etc., may govern the performance of a given embodiment of method 500.

Figure 6:
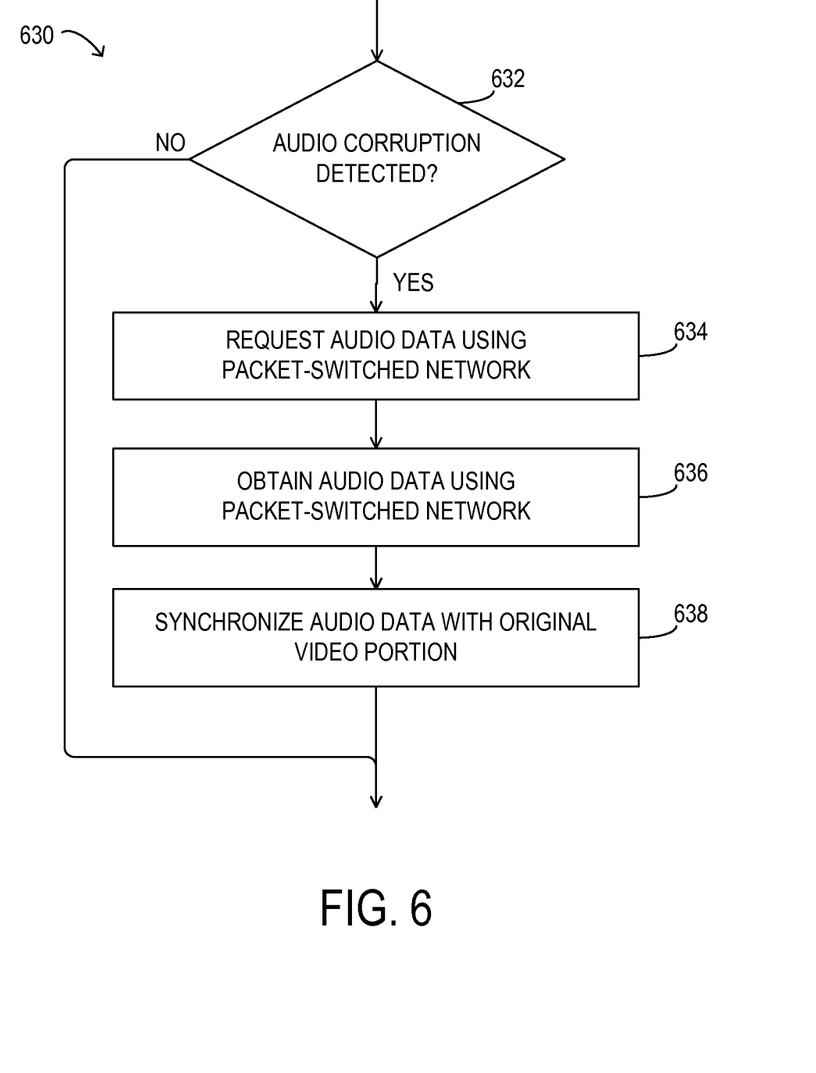

Referring now to FIG. 6, one embodiment of a method 630 for combining a television signal with an obtained audio signal is shown. In particular, method 630 depicts one embodiment of obtaining audio data for combining with an original video portion of a television signal. It is noted that the operations depicted in FIG. 6 may be rearranged, duplicated, or omitted in various embodiments of method 630. Method 630 may serve as an example of operation 530, shown in FIG. 5.

First, a decision is made whether or not audio corruption in the AV frame is detected (operation 632). If the result of operation 632 is NO, then method 630 is completed. If the result of operation 632 is YES, then audio data corresponding to the audio segment may be requested via a packet-switched network (operation 634). It is noted that in some embodiments, operation 632 is not performed, such that the remaining operations in method 630 are performed for each audio segment in the AV frame. The packet-switched network may be a broadband network. In some embodiments of operation 634, audio data are requested from service provider 110 via network 130, as shown in FIGS. 1-3.

The audio data may then be obtained via the packet-switched network (operation 636). In certain embodiments of operation 636, service provider 110 sends the audio data via network 130, as shown in FIGS. 1-3. Then, the obtained audio data may be synchronized with the original video portion (operation 638). In some embodiments, the obtained audio data may replace an audio segment of the original audio portion of the television signal. In certain cases, the obtained audio data may augment the original audio portion in operation 638, such that the original audio portion of the television signal is retained. Although method 630 is described with respect to a single segment of audio data, multiple instances of method 630 may be executed in parallel. In some cases, method 630 involves requesting and obtaining multiple audio data segments.

Figure 7:
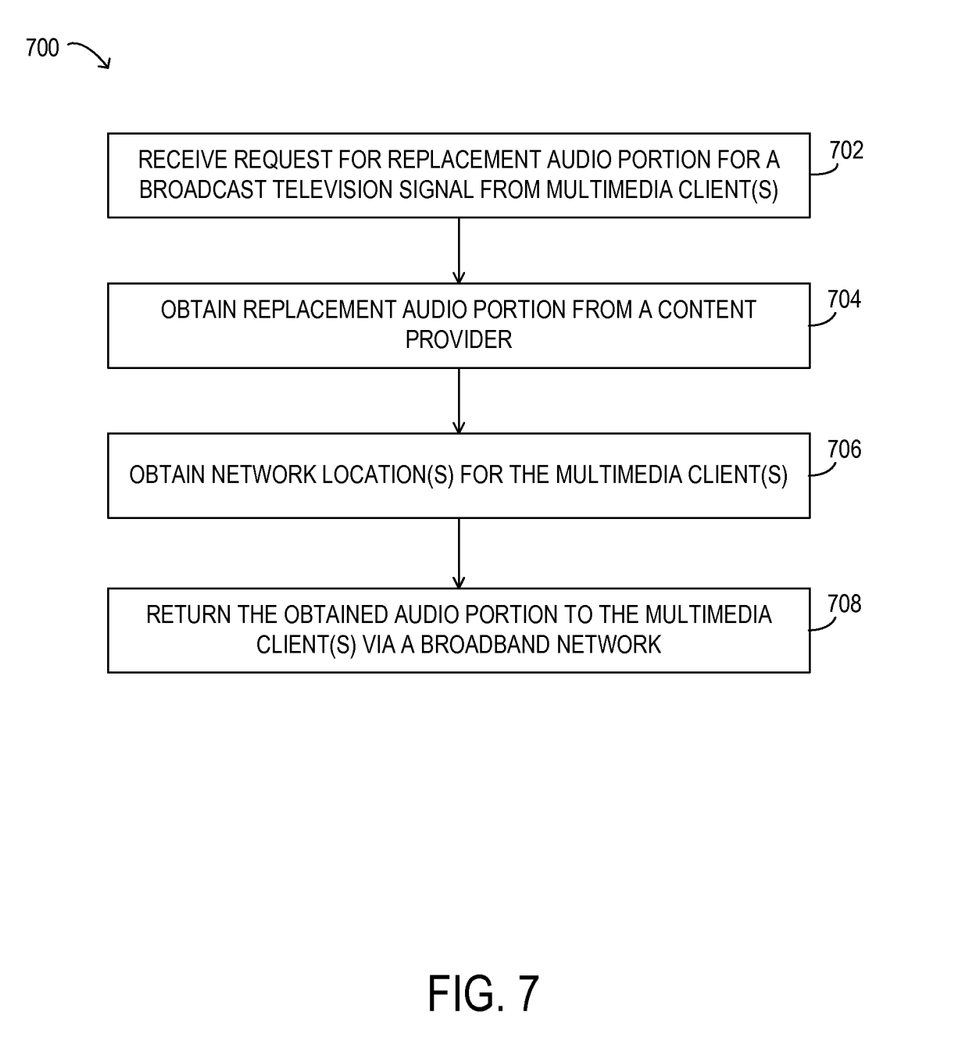

Referring now to FIG. 7, one embodiment of method 700 for obtaining an audio portion of a television signal is shown. It is noted that in some embodiments, method 700 is performed by service provider 110 (see FIGS. 1-3). A request for an audio portion for a broadcast television signal is received from at least one multimedia client (operation 702). It is noted that in some embodiments the request may be for a replacement audio portion. A network location for the multimedia client may be obtained in operation 702. In some implementations of operation 702, client 120 specifies a segment of the audio portion in the request received by service provider 110. In some cases, a plurality of clients request the same audio portion in operation 702. Next, the requested audio portion is obtained from a content provider (operation 704). In operation 704, service provider 110 may communicate with content provider 160 for obtaining the requested audio portion. After obtaining the requested audio portion in operation 704, the requested audio portion is sent to one or more clients (operation 706). In some embodiments, an audio portion is multicast to a plurality of clients in operation 706.

Figure 8A:
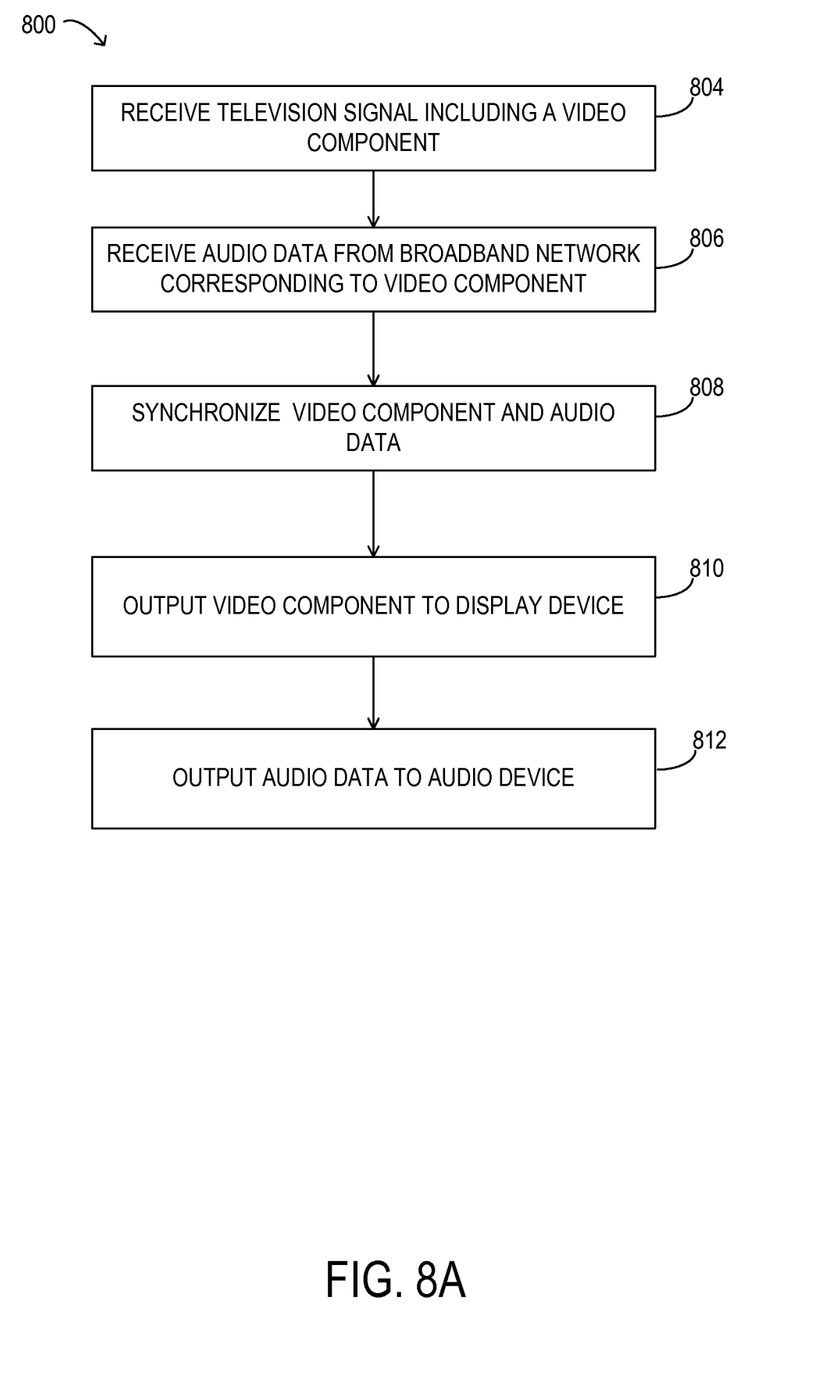

Turning now to FIG. 8A, one embodiment of method 800 for obtaining an audio portion of a television signal is shown. It is noted that in some embodiments, method 800 is performed by multimedia client 120 or multimedia client 400 (see FIGS. 1-4). A television signal, including a video component, may be received (operation 804). The television signal may be input at signal input port 450 (see FIG. 4). Audio data, corresponding to the video component, may be received from a broadband network (operation 806). The audio data may be received via GW 423 (see FIG. 4). The video component and the audio data may be synchronized (operation 808). In one example, buffer(s) 416 (see FIG. 4) are used to synchronize the video component and the audio data. The video component may be output to a display device (operation 810). The video component may be output to display 426 (see FIG. 4). The audio data may be output to an audio device (operation 812). The audio data may be output to audio device 428 (see FIG. 4).

Figure 8B:
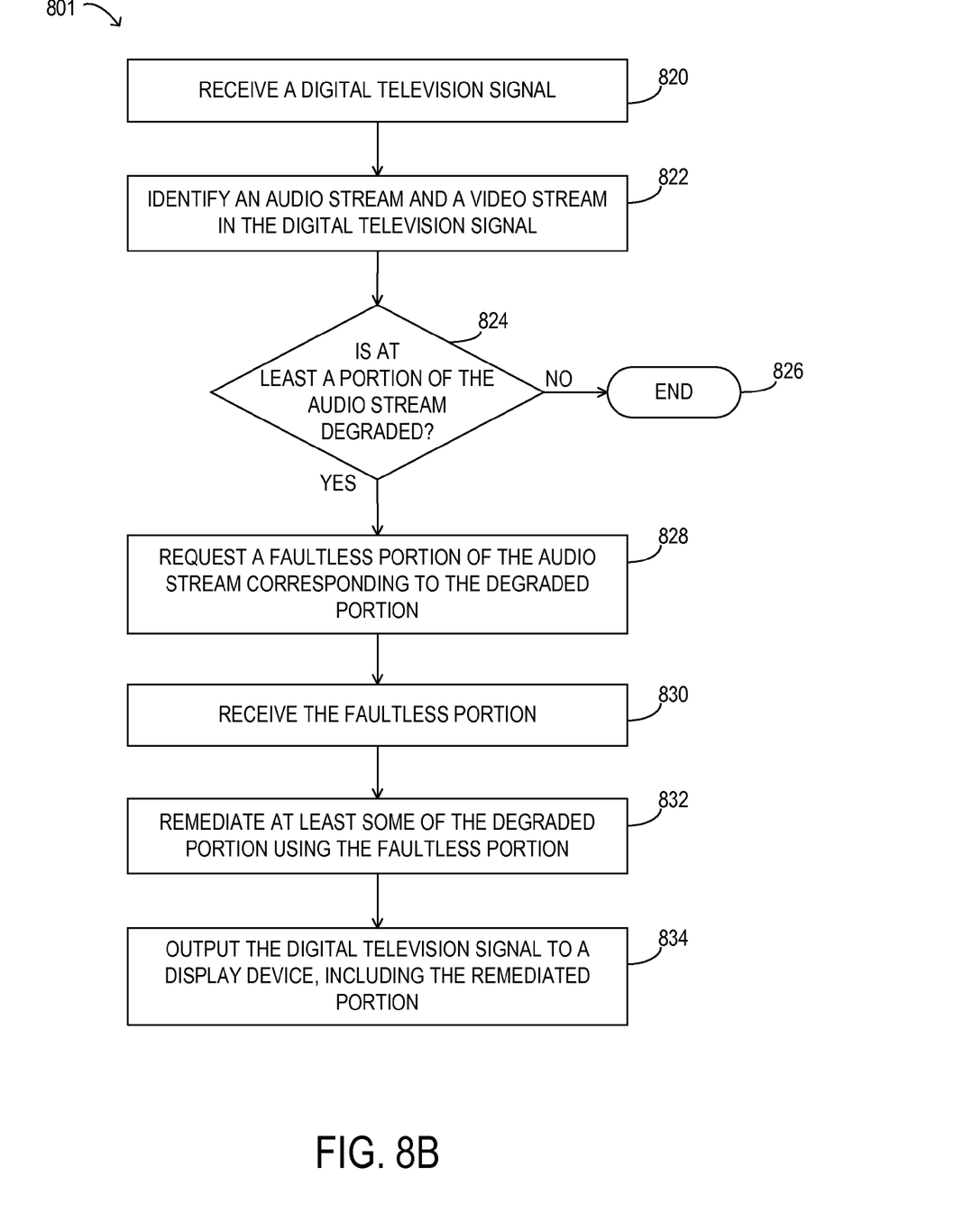
Figure 8C:
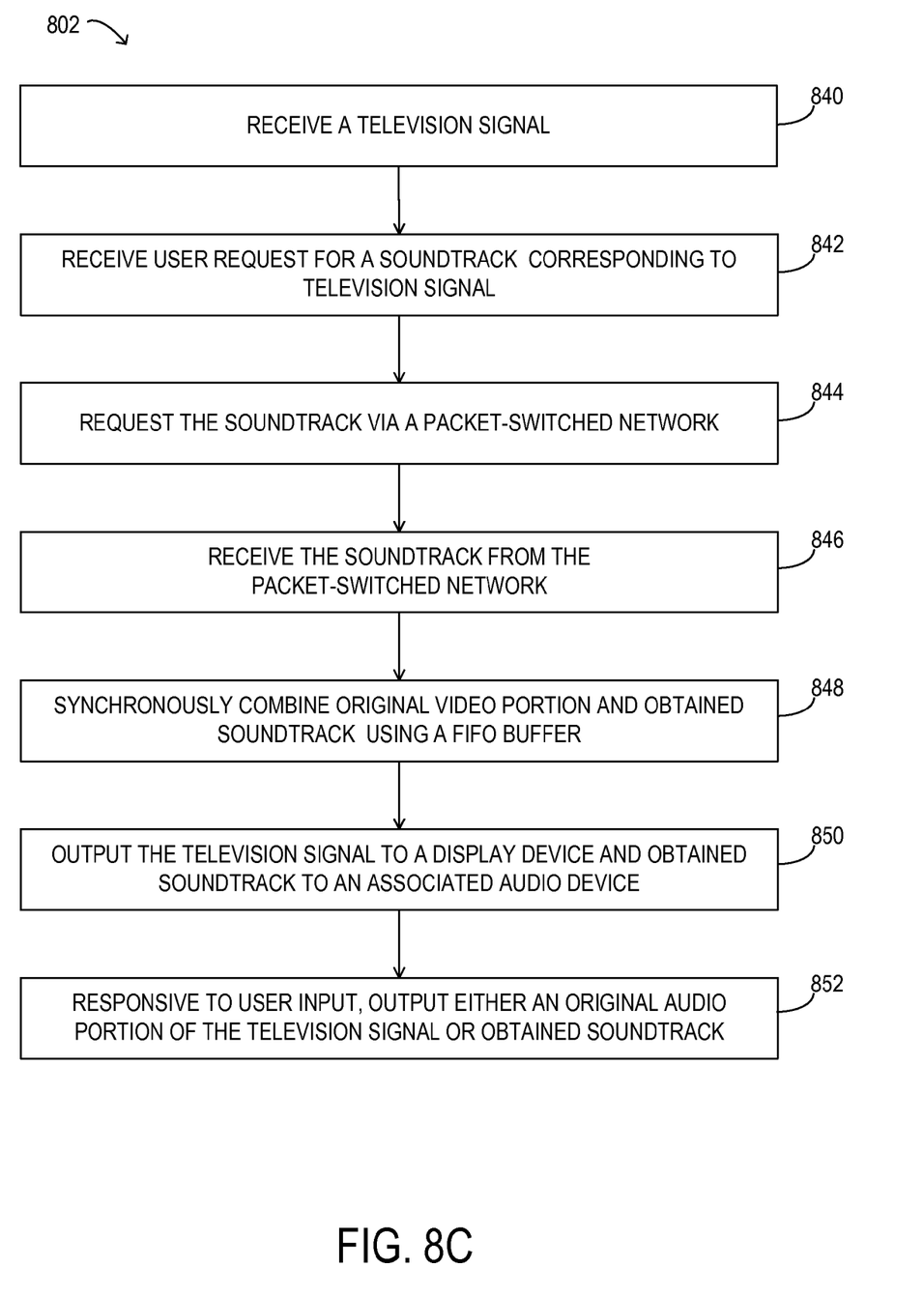

In reference to FIG. 8B, one embodiment of method 801 for obtaining an audio portion of a television signal is shown. It is noted that in some embodiments, method 801 is performed by multimedia client 120 or multimedia client 400 (see FIGS. 1-4). A digital television signal may be received (operation 820). An audio stream and a video stream in the digital television signal may be identified (operation 822). It is noted that decoder 440 (see FIG. 4) may be configured to identify audio and video streams. A decision may be made if at least a portion of the audio stream is degraded (operation 824). The audio stream may be considered degraded in operation 824 if there is a quality error in the received audio stream, if the audio stream is of a degraded quality (without actual error), or simply if the audio stream is undesired. If the result of operation 824 is NO, then method 801 ends (operation 826).

If the result of operation 824 is YES, then a faultless portion of the audio stream corresponding to the degraded portion may be requested (operation 828). A faultless audio portion may be error free, of enhanced quality, or may possess desirable attributes related to the audio content. For example, the faultless audio portion may be a soundtrack in a spoken language for a geographic location of client 120. The faultless portion may be requested from service provider 110, which in turn, may obtain the faultless portion from a content provider 160 (see FIGS. 1-3). The faultless portion may be received (operation 830). The faultless portion may be received via a broadband network in segments, or as a complete portion for the corresponding audio stream. In some cases, the faultless portion may be received in advance in response to user input indicating the digital television signal. At least some of the degraded portion may be remediated using the faultless portion (operation 832). In some cases, the faultless portion is used to replace at least some of the degraded portion in the digital television signal. The remediation may also augment the original television signal with the faultless portion. The digital television signal may be output to a display device, including the remediated portion (operation 834).

Referring now to FIG. 8B, one embodiment of method 802 for obtaining an audio portion of a television signal is shown. It is noted that in some embodiments, method 802 is performed by multimedia client 120 or multimedia client 400 (see FIGS. 1-4). A television signal may be received (operation 840). A user request for a soundtrack corresponding to the television signal may be received (operation 842). The user request may be received from a user of client 120, and may specify a predetermined start point and/or duration of the television signal, such as a particular television program, for combining with the soundtrack. The soundtrack may be requested via a packet-switched network (operation 844). The soundtrack may be requested from service provider 110 via packet-switched network 130. The soundtrack may then be received from the packet-switched network (operation 846). Service provider 110 may obtain the soundtrack from content provider 160 and forward the soundtrack to client 120. The obtained soundtrack may be combined with an original video portion using a FIFO buffer (operation 848). In some examples, audio delivery 414 may use buffer(s) 416 to synchronize the obtained soundtrack with the original video portion from the television signal.

Then, a television signal may be output to a display device, while the soundtrack is output to an associated audio device (operation 850). The display device and the associated audio device may be included in a television device. In response to user input, an original audio portion of the television signal or the obtained soundtrack may be output (operation 852). The user input may be provided to select an available soundtrack for the television signal. In some embodiments, the obtained soundtrack may include multiple audio tracks, such as a stereo signal, multiple loudspeaker signals, or alternative audio tracks, such that the user may select from one of a number of available soundtracks for output.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for presenting multimedia content, the method comprising:
    wirelessly receiving, from a broadcaster, a multimedia content signal including a broadcast video component and a broadcast audio component, wirelessly transmitted by the broadcaster;
    receiving, from a multimedia service provider via a wireline network, a re-transmission of the multimedia content signal, the re-transmission of the multimedia content signal including a wireline video component and a wireline audio component;
    generating, by a multimedia client, a synchronized content signal by performing one of:
        synchronizing the broadcast audio component with the wireline video component; and
        synchronizing the broadcast video component with the wireline audio component; and
    outputting the synchronized content signal to a presentation device including an audio device and a display.

2. The method of claim 1, wherein the wireline network is a packet-switched network.

3. The method of claim 2, wherein the packet-switched network is an IP network.

4. The method of claim 1, further comprising:
    storing a portion of the broadcast video component as stored content in a buffer; and
    outputting the stored content in synchronous alignment with the broadcast audio component.

5. The method of claim 1, wherein the broadcaster and the multimedia service provider are different entities.

6. The method of claim 1, wherein the multimedia content signal wirelessly transmitted by the broadcaster is terrestrially broadcasted by the broadcaster.

7. The method of claim 1, wherein the multimedia content signal wirelessly transmitted by the broadcaster is satellite broadcasted by the broadcaster.

8. The method of claim 1, further comprising:
    decoding the synchronized content signal.

9. The method of claim 1, further comprising:
    responsive to receiving a user request, issuing a server request to return replacement audio content suitable for replacing at least a portion of the broadcast audio component.

10. A method for providing replacement audio for multimedia content, the method comprising:
    receiving, via a wireline network, a request from a multimedia client for replacement audio content corresponding to a portion of a multimedia content signal wirelessly received by the multimedia client from a terrestrial broadcaster; and
    re-transmitting to the multimedia client, over the wireline network, the portion of the multimedia content signal as the replacement audio content.

11. The method of claim 10, wherein the wireline network includes a digital subscriber line connected to the multimedia client.

12. The method of claim 10, wherein responsive to receiving a plurality of requests for the replacement audio content from a respective plurality of multimedia clients:
    multicasting the replacement audio content to the plurality of multimedia clients.

13. The method of claim 12, wherein the plurality of multimedia clients are located in a common media market.

14. The method of claim 12, wherein a multimedia service provider re-transmits the multimedia content signal over the wireline network, further comprising:

obtaining a plurality of network locations for the plurality of multimedia clients.

15. The method of claim 14, wherein the multimedia service provider is different than the broadcaster.

16. The method of claim 10, wherein the replacement audio content is formatted for streaming over a packet-switched network.

17. A client device for remediating multimedia content, the client device comprising:

a processor;

a computer readable medium, accessible to the processor, storing a program of processor executable instructions, which, when executed by the processor, perform operations comprising:

wirelessly receiving, from a terrestrial broadcaster, a multimedia content signal wirelessly transmitted by the terrestrial broadcaster;

buffering the multimedia content signal in a buffer;

responsive to detecting degradation in a portion of an audio component of the multimedia content signal wirelessly received from the terrestrial broadcaster, requesting a multimedia service provider other than the terrestrial broadcaster for replacement audio content corresponding to the portion of the audio component exhibiting degradation;

receiving, via a wireline network, the replacement audio content from the multimedia service provider;

substituting the replacement audio content for the portion of the audio content exhibiting degradation; and outputting a remediated multimedia content signal, including the replacement audio content, to a presentation device including an audio device and a display.

18. The client device of claim 17, wherein the wireline network is a packet-switched network.

19. The client device of claim 18, wherein the method includes:

converting the replacement audio content from a packet-based format to a television signal format.

20. The client device of claim 17, wherein the replacement audio content includes an enhanced version of the portion of the audio content exhibiting degradation.

21. The client device of claim 17, wherein the presentation device is a television.

22. The client device of claim 17, wherein the wireline network is a cable television network.

23. A computer-readable storage device including embedded program instructions, which, when executed by a processor, perform operations comprising:

responsive to receiving a user request for replacement audio content corresponding to a degraded portion of an audio component of a multimedia content signal wirelessly received by a user from a terrestrial broadcaster, requesting a multimedia service provider for replacement audio content corresponding to the degraded portion of the audio component;

receiving, via a network adapter coupled to a wireline network, the replacement audio content;

synchronizing the replacement audio content with the multimedia content signal wirelessly received from the terrestrial broadcaster; and outputting a multimedia signal resulting from the synchronizing to a presentation system including an audio device and a display.

24. The computer readable storage device of claim 23, wherein the soundtrack includes a spoken language translation into a different language of an audio component of the television signal.

25. The computer readable storage device of claim 24, wherein the method includes: buffering the multimedia content signal wirelessly received in a first-in first-out buffer, and wherein synchronizing the replacement audio content with the multimedia content signal includes accessing the first-in first-out buffer.

26. The computer readable storage device of claim 23, wherein the multimedia content signal is a digital television signal.

27. The computer readable storage device of claim 23, wherein the user request specifies a predetermined portion of the multimedia content signal.

28. The computer readable storage device of claim 23, wherein the method includes: selecting, in response to receiving user input, between outputting the replacement audio content and the degraded portion of the audio component.

29. The computer readable storage device of claim 23, wherein the audio component includes multiple audio tracks.

* * * * *